(No Model.) 6 Sheets—Sheet 1.

H. LOEWENBACH & C. FISHER.
STATIONERY HOLDING AND DISTRIBUTING DEVICE.

No. 538,173. Patented Apr. 23, 1895.

WITNESSES,
M. M. Wiles
J. Lewenberg & Co.

INVENTORS,
Hugo Loewenbach,
Charles Fisher,
BY John B. Wiles,
ATTORNEY.

(No Model.) 6 Sheets—Sheet 2.

H. LOEWENBACH & C. FISHER.
STATIONERY HOLDING AND DISTRIBUTING DEVICE.

No. 538,173. Patented Apr. 23, 1895.

WITNESSES,
M. M. Wiles
J. Swenberger Jr.

INVENTORS,
Hugo Loewenbach,
Charles Fisher,
BY John E. Wiles,
ATTORNEY.

(No Model.) 6 Sheets—Sheet 3.
H. LOEWENBACH & C. FISHER.
STATIONERY HOLDING AND DISTRIBUTING DEVICE.

No. 538,173. Patented Apr. 23, 1895.

WITNESSES,

INVENTORS,
Hugo Loewenbach,
Charles Fisher,
By John E. Wiles,
ATTORNEY.

(No Model.) 6 Sheets—Sheet 4.

H. LOEWENBACH & C. FISHER.
STATIONERY HOLDING AND DISTRIBUTING DEVICE.

No. 538,173. Patented Apr. 23, 1895.

WITNESSES,
M. M. Wiles
J. Lewenberger Jr.

INVENTORS,
Hugo Loewenbach
Charles Fisher
By John E. Wiles
ATTORNEY.

(No Model.) 6 Sheets—Sheet 5.

H. LOEWENBACH & C. FISHER.
STATIONERY HOLDING AND DISTRIBUTING DEVICE.

No. 538,173. Patented Apr. 23, 1895.

WITNESSES,
M. M. Wiles
J. Leamberger Jr.

INVENTORS,
Hugo Loewenbach
Charles Fisher,
BY John E. Wiles
ATTORNEY.

(No Model.) 6 Sheets—Sheet 6.

H. LOEWENBACH & C. FISHER.
STATIONERY HOLDING AND DISTRIBUTING DEVICE.

No. 538,173. Patented Apr. 23, 1895.

WITNESSES,
M. M. Wiles
J. Lenenberger

INVENTORS,
Hugo Loewenbach.
Charles Fisher,
By John E. Wiles.
ATTORNEY.

United States Patent Office.

HUGO LOEWENBACH AND CHARLES FISHER, OF MILWAUKEE, WISCONSIN, ASSIGNORS TO THE GLOBE REGISTER COMPANY, OF SAME PLACE.

STATIONERY HOLDING AND DISTRIBUTING DEVICE.

SPECIFICATION forming part of Letters Patent No. 538,173, dated April 23, 1895.

Application filed March 23, 1894. Serial No. 504,813. (No model.)

*To all whom it may concern:*

Be it known that we, HUGO LOEWENBACH and CHARLES FISHER, citizens of the United States, residing at Milwaukee, county of Milwaukee, State of Wisconsin, have invented a certain new and useful Improvement in Stationery Holding and Distributing Devices; and we declare the following to be a full, clear, and exact description of the invention, such as will enable others skilled in the art to which it pertains to make and use the same, reference being had to the accompanying drawings, which form a part of this specification.

Our invention relates to new and useful improvements in devices for holding and distributing sheets of paper, tickets, envelopes, &c., and will be fully described hereinafter.

In the accompanying drawings, Figs. 10 and 11 are detail views illustrating still another form of feeding device.

In said drawings, A designates a casing provided in its lower part with a receptacle or compartment A' for letter heads, and provided in its front wall with a slot $a$ communicating with said receptacle. A second receptacle B for envelopes is provided in the upper part of the casing and a second slot $b$ is formed in the front wall of the casing and communicates with the receptacle B. A friction device is arranged in each compartment adjacent to the slot in the front wall thereof, and arranged to engage with the sheets of paper or the envelopes within the compartment, and said friction device is constructed in substantially the same manner as that shown in our prior application for patent, Serial No. 488,581, filed October 19, 1893, said device consisting of one or more rods C C extending through the front of the casing and provided at their outer ends with a suitable handle $c$ and a yoke C' at the inner ends of said rods, carrying a cushion or shoe $c^2$ of rubber or other elastic material.

Figure 3:
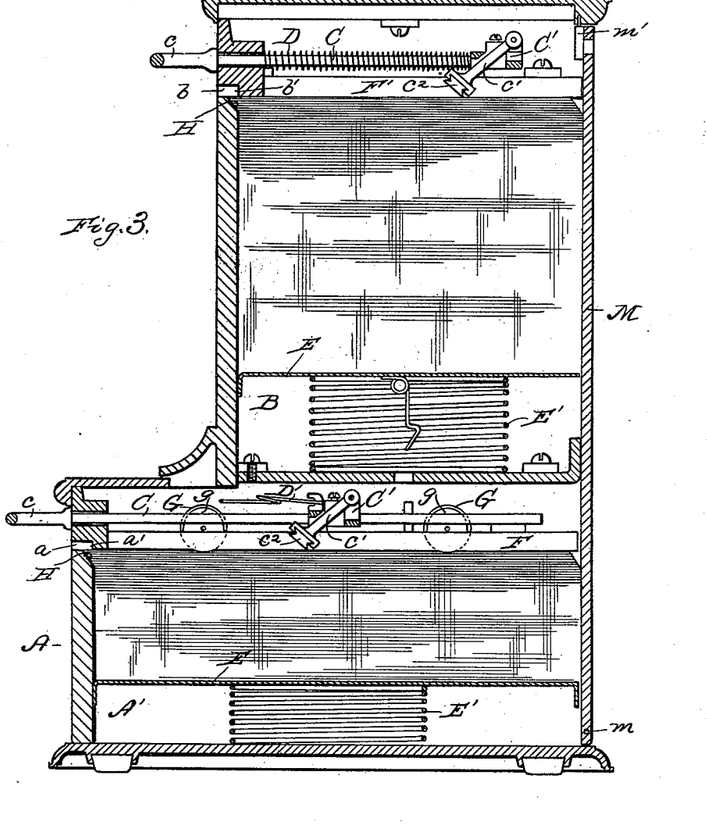
Fig. 3 is a vertical sectional view of the same taken on line 3—3 of Fig. 1.

Any suitable device may be employed for retracting the friction device as for instance the spring D shown in Fig. 3, arranged upon the rod C and operating in the same manner as described in our aforesaid prior application, or the spring D' shown in the lower part of Fig. 3, which is simply a two-armed spring engaged at one extremity with the yoke C' and at the other extremity with a stationary part of the casing or frame and serving to normally retract the friction device in the same manner as the other form of spring.

In each of the compartments is provided a movable plate E pressed toward the slot or opening in the front of the compartment by means of suitable springs E' against which plate a series of sheets of paper or envelopes may be supported, in position for advancement one at a time by the friction device through the horizontal slot or opening.

Suitable horizontal flanges F F are arranged adjacent to opposite sides of the receptacle A' against which the series of sheets is pressed by the spring supported plate E in an obvious manner, and the pivoted arm $c'$ carrying the cushion or shoe of rubber is arranged to depend from its pivotal support between the opposed edges of said flanges. Similar flanges F' F' are arranged in the upper compartment B against which the series of envelopes is held by the plate E in the manner described.

In order to enable the friction device to freely advance the uppermost sheet in the lower compartment, we may if desired employ suitable means for lessening the friction between the flanges F F and the uppermost sheet and to this end we find it convenient to employ suitable anti-friction rollers G G, journaled in vertically disposed ears $g$ $g$ on said flanges F F and arranged to extend slightly below the lower surfaces of said flanges so as to engage with the uppermost sheet within the compartment A'. When the friction device engages with said uppermost sheet, the rollers G will rotate freely and permit the free removal of said sheet in an obvious manner.

As shown in the drawings the lower edges of the flanges F F and F' F' are arranged in the same horizontal plane as the lower edges of the slots $a$ and $b$, there being at the inner part of said slots downwardly extending shoulders $a'$ and $b'$ respectively arranged in line with the inner surfaces of the front walls of the respective compartments. The edge of the wall of each compartment is beveled outwardly and upwardly in the manner shown more particularly in Figs. 3 and 4 at H, said oblique or beveled surface communicating with the lower part of the horizontal slot in the compartment and forming an oblique passage from the upper part of the compartment communicating with said slot. By this construction, the forward edges of the series of sheets or of envelopes as the case may be, are held in vertical alignment between the front and rear walls of the respective compartments with the exception of such sheets or envelopes as lie above the lower angle of the oblique face H and such sheets or envelopes will by the action of the friction device arrange themselves so as to conform to the said oblique surface in an obvious manner so that the forward edge of the uppermost sheet or envelope will rest at a point considerably in front of the shoulder $a'$ or $b'$. It follows from this construction that when the friction device is actuated to advance a sheet or envelope the sheet or envelope engaged thereby being so placed as to extend well into the horizontal slot or opening in the front wall of the casing, will slip freely over the upper edge of the oblique face H and out through the slot while all the rest of the sheets or envelopes which are above the level of the lower angle or edge of the oblique face H will abut against the said face, and be prevented from entering the slot and being advanced by the friction device. In this manner an accurate operation of the friction device is insured and the advancement of but one sheet of paper or one envelope at each operation of said friction device is insured.

In some instances we may prefer to provide in addition to the friction device, a suitable auxiliary friction device for engagement with the uppermost sheet or envelope, and adapted to gradually work the sheets or envelopes at the top of the series forward so as to rest against the oblique surface H. To this end we find it convenient to provide a suitable loop or bail I which is conveniently pivoted to the yoke C' in the manner shown more particularly in Fig. 4, and is arranged to depend so as to rest in engagement with the uppermost sheet or envelope in the compartment, said loop or bail being limited as to its rearward movement by engagement with a shoulder or stop $i$ but being free to swing forwardly, in an obvious manner. It follows from this construction that upon a forward movement of the friction device, said bail or loop will by its engagement with the uppermost sheet or envelope be moved into engagement with the stop or shoulder $i$, when the forward movement of the friction device will cause the said bail or loop to rub against the upper surface of said sheet or envelope so as to work it forward into position for advancement through the slot or opening in the front of the compartment and this operation is true not only of the uppermost sheet or envelope but of all the sheets or envelopes between the level of the lower faces of the horizontal flanges F or F' and the lower edge or angle of the oblique face H, the sheets or envelopes immediately below the uppermost sheet or envelope being drawn or worked forward by the frictional engagement of such sheets with each other until stopped by the oblique surface H. In this manner, as soon as one sheet or envelope is removed, the next sheet or envelope below is in position to take its place and to be removed in the same manner, by the next subsequent operation of the friction device.

Figure 4:
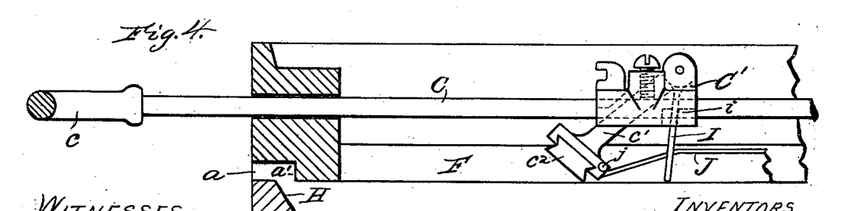
Fig. 4 is an enlarged detail view of a somewhat different form of friction feeding device.

As a further and separate improvement we prefer when the auxiliary friction device I is employed to provide suitable lateral ribs or flanges J J upon the inner faces of the flanges F F and to provide upon opposite sides of the friction device, suitable laterally projecting pins $j$ $j$ for engagement with said ribs or flanges J J, the forward ends of said ribs or flanges being inclined in the manner shown in Fig. 4. By this construction as the friction device is retracted said pins $j$ $j$ are brought into engagement with the oblique or inclined forward ends of the ribs J J, and the friction device thereby raised out of engagement with the uppermost sheet or envelope about midway of the rearward movement of the rod C C in which position it will be held, by the engagement of the pins $j$ $j$ with the ribs or flanges J J until it reaches the same point in its forward movement. It follows from this construction therefore, that during the first part of the forward movement of the friction device the loop or bail I will engage with the uppermost sheet or envelope so as to operate to draw the same forward and during the latter part of the forward movement of the friction device, the pivoted arm with the rubber shoe will be permitted to engage with the said uppermost sheet or envelope to advance the same through the slot or opening, the more forcible engagement of the main friction device with the sheet or envelope tending however to crowd the series of sheets or envelopes downward against the yielding support plate E below the loop or bail I in an obvious manner. By this construction the auxiliary friction device serves to gradually advance the sheets or envelopes near the top of the series into position for ready advancement through the slot or opening by means of the main friction device.

Figure 1:
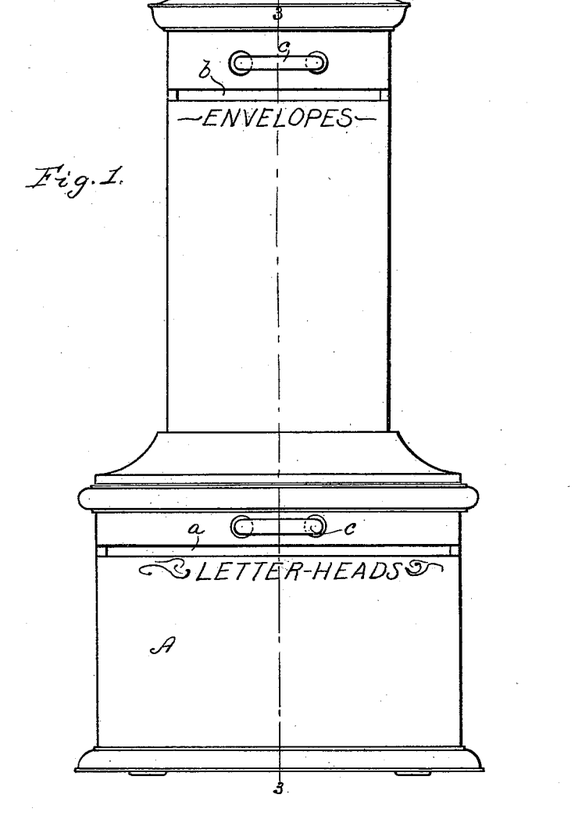
Figure 1 is a front elevation of one form of our improved device for holding a supply of letter sheets and envelopes.
Figure 2:
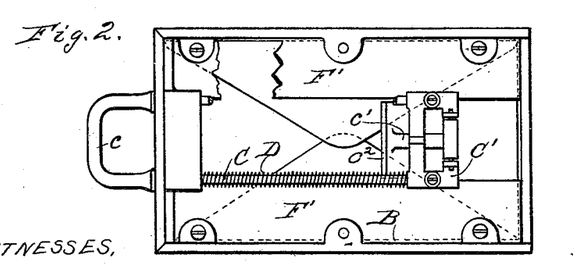
Fig. 2 is a top plan view of the envelope compartment with the cover removed.

As shown more particularly in Fig. 2 we find it convenient in arranging the envelopes within the receptacle or compartment, to arrange the same with the lapels or flaps uppermost, and to so adjust the friction device upon the longitudinal rods that it will engage with the uppermost envelope of the series just back of the point of the lapel or flap. We find this arrangement of importance from the fact that owing to the exceeding compressibility of the series of envelopes due to the folding of the paper in their manufacture, the entire series of envelopes will yield readily to a very slight downward pressure so that it is difficult for the friction device to engage with the uppermost envelope of the series if they are arranged with the smooth sides up, but by placing the lapels or flaps uppermost, a slight obstruction is afforded in the path of the friction device whereby a positive engagement of the friction device with the uppermost envelope of the series is insured.

Figure 5:
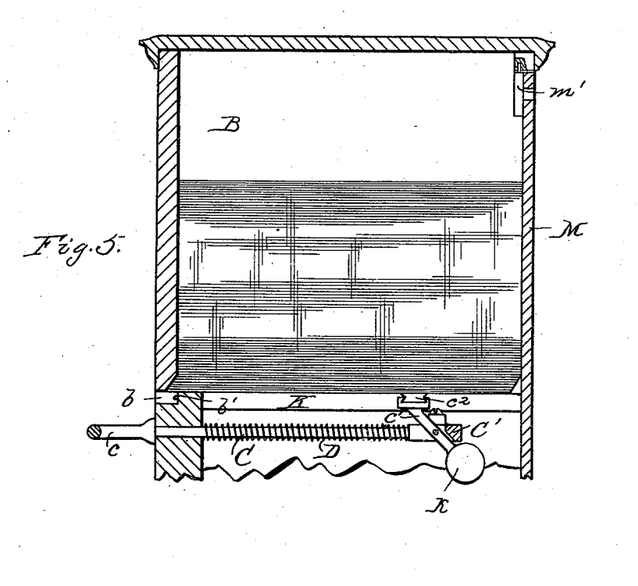
Fig. 5 illustrates another form of compartment and of the feeding device.

In the particular form of construction illustrated in Fig. 5, the receptacle or compartment for the sheets or envelopes is of the same general construction as before described with the exception that the slot or opening for the discharge of said sheets or envelopes therefrom, is arranged at the lower instead of the upper part of the receptacle, and the sheets or envelopes arranged to rest by gravity upon the horizontal flanges K in position for engagement by the friction device which in this instance is located below instead of above the receptacle or compartment. In this form of construction a counter-weight $k$ is provided upon the pivoted arm which carries the elastic shoe or cushion and serves to normally hold the free end of said pivoted arm upward so as to maintain a constant engagement of the shoe with the lowermost sheet or envelope of the series.

Figure 6:
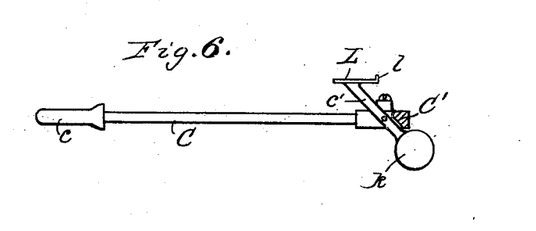
Fig. 6 is a separate detail view of still another form of feeding device.

In the particular form of construction illustrated in Fig. 6 the counter-weight $k$ is employed as before, but instead of the elastic shoe or cushion, at the free end of the pivoted arm, a flat plate L is provided, having at its rear edge an upturned lip $l$ for engagement with the lowermost sheet or envelope of the series. This latter construction is designed for use chiefly for the envelope feed.

Figure 7:
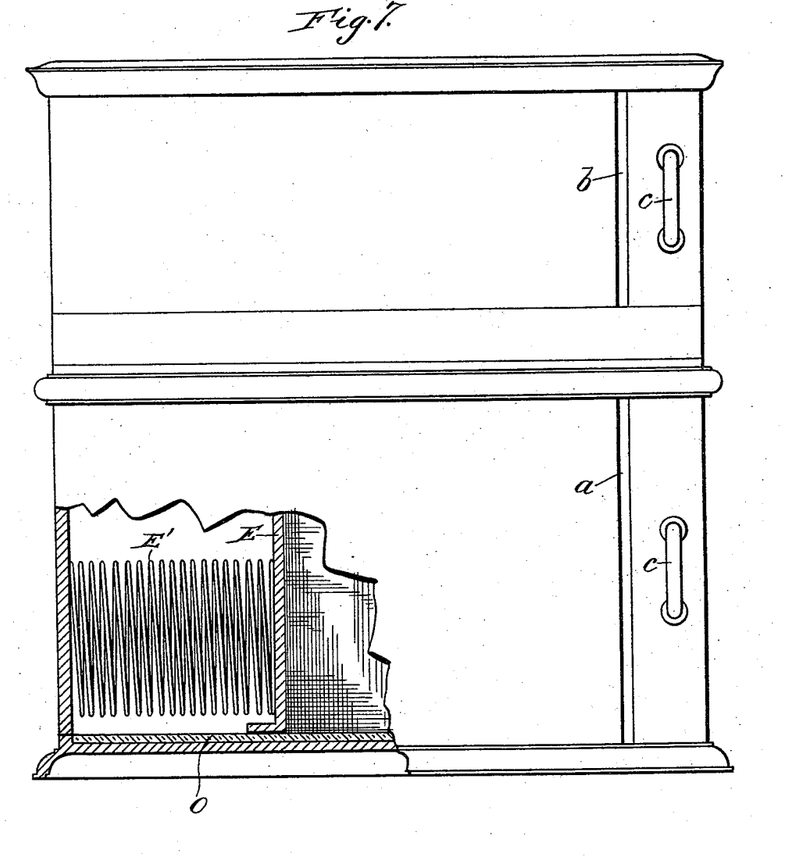
Fig. 7 is a front elevation and Fig. 8 an end elevation of a somewhat different form of our device, the same being arranged to advance the sheets of paper or envelopes in a vertical position.
Figures 8, 10:
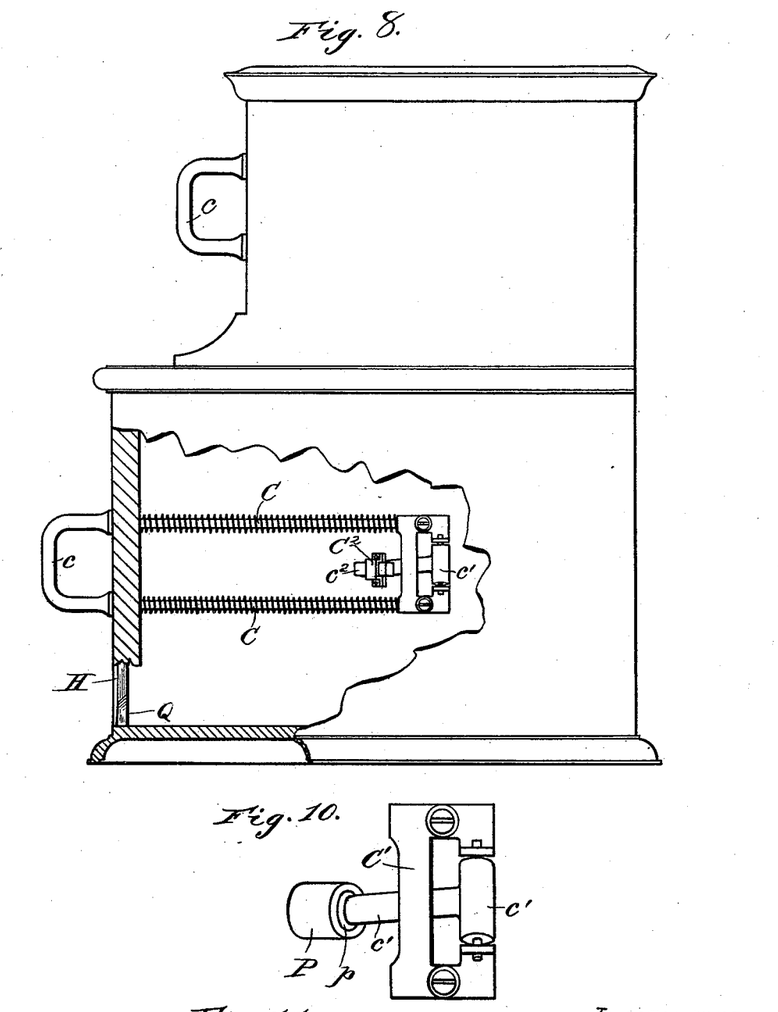

In the particular form of construction illustrated in Figs. 7 and 8, the slots in the front wall of the casing are arranged vertically at one side of the casing, and the friction devices are arranged in a vertical position at the side of the casing adjacent to said slots and adapted to engage with the end one of the sheets or envelopes in the series, which sheets or envelopes are arranged vertically and rest on their edges, and the movable plate E is pressed by the spring E' against said series in substantially the same manner as before described.

Figure 9:
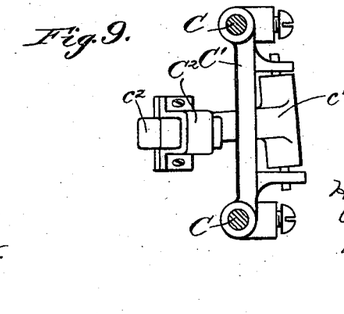
Fig. 9 is a detail view of still another form of feeding device.

If desired we may provide in the bottom of either one of the compartments a slab O of glass, metal or other material capable of receiving a very smooth finish or polish and upon which the sheets or the envelopes may be advanced by the movable plate and the spring without liability of the lower edges of the sheets or envelopes sticking or binding against the bottom of the casing. In this form of device, the friction feeding mechanism may be of the same form as shown and described in the foregoing, or it may be of the construction illustrated in Fig. 9, in which the axis of the pivoted arm $c'$ is arranged obliquely so that the free end of said arm will swing toward the surface of the envelope or paper with which it is to engage. In some instances we find it convenient to construct the elastic shoe $c^2$ in the manner shown in said Fig. 9, said shoe consisting of a strip or bar of rubber adjustably held at the end of the pivoted arm by means of a clamp $C^2$ whereby the rubber cushion or shoe may be readily removed and replaced by a new one, or adjusted so as to project to a desired extent beyond the end of the arm in an obvious manner.

Figure 11:
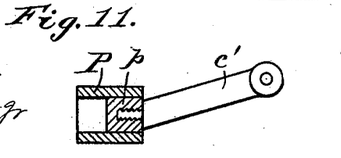

The particular form of friction device illustrated in Figs. 10 and 11, comprises the yoke and the pivoted arm as before, but at the free end of said arm is secured a tubular shoe or cup P of rubber, leather or analogous material, and adapted for engagement in the manner before described with the surface of the sheet or envelope to advance the same through the slot. In the particular construction illustrated the tubular cup or shoe P is secured to the outside of a cylindric block $p$ which is removably attached to the free end of the arm $c'$. This particular form of device will afford a more positive engagement with the surface of the sheet or envelope than would a solid block of rubber or analogous material, as in the forms of friction devices before described, from the fact that when the cup-shaped shoe is pressed into contact with the surface of a sheet or envelope, the air will be partially expelled from the interior of said cup-shaped shoe, and will thereby operate to produce a slight suction, by reason of which the sheet or envelope will be held firmly against the cup-shaped shoe and the liability of the shoe slipping while in contact with the surface of said sheet or envelope will be thereby entirely avoided.

Figure 12:
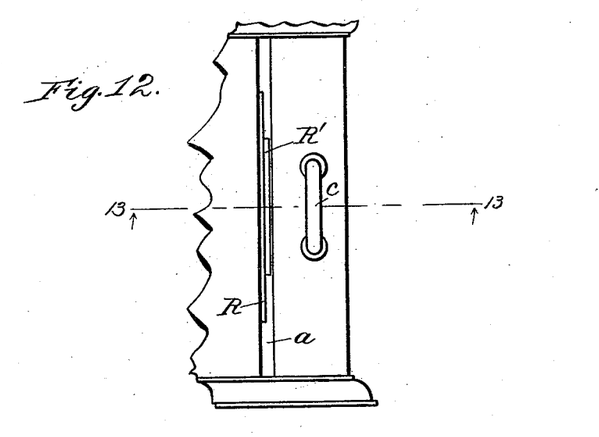
Fig. 12 is a broken front elevation and Fig. 13 a horizontal sectional view taken on line 13—13 of Fig. 12 of a different form of construction of the retaining devices at the opening through the casing.
Figure 13:
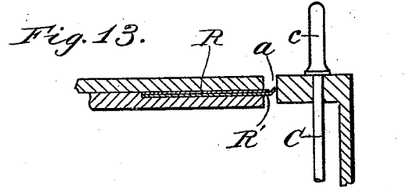

In some instances, when the sheets of paper or the envelopes are located upon edge, there may be considerable liability of the lower edge of the sheet or envelope at the end of the series dragging a little upon the bottom, so as to curl or bend to some extent, and thereby be liable to bind against the side of the opening or slot. In order to avoid the liability of trouble in this respect we may provide any suitable means for permitting the sheets or envelopes to be advanced one at a time with their edges somewhat bent or curved out of a straight line. To this end we may employ the form of construction shown in Fig. 8 in which the beveled face H of the wall at the side of the slot or opening is provided at its lower end with an enlargement Q which is formed by simply cutting away the lower edge of the wall H, as shown so as to form a curved or concave surface. If desired, instead of this form of construction, the form shown in Figs. 12 and 13 may be employed in which a suitable plate R is secured to the inside of the front wall of the casing and arranged to extend partly over the slot or opening $a$ and to which is secured an oblique nose R' formed from a similar plate or sheet of metal bent at its edge in the manner shown more particularly in Fig. 13. By this construction, as shown more particularly in Fig. 12, the oblique nose is brought close to the side wall of the slot or opening $a$, at the center of said opening while the upper and lower ends of said opening are left free and unobstructed and it follows therefore that sheets or envelopes which are somewhat bent or curled at their upper or lower edges, may be as readily advanced through the opening as if they had remained perfectly straight and flat.

Figure 14:
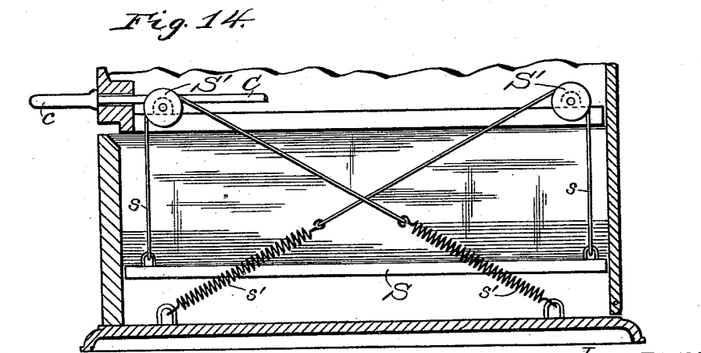
Fig. 14 illustrates still another form of device for holding the series of sheets or envelopes in position for engagement by the friction device.

Instead of the forms of devices shown in the first figures of the drawings and before described, for holding the series of sheets or envelopes in position for successive advancement by the friction device, we may employ the form of device shown in Fig. 14, which comprises a vertically movable plate S for supporting the series and supported by suitable cords $s\ s$ running over suitable pulleys S' S' and extending diagonally downward and connected at their lower ends with suitable springs $s'\ s'$. By this form of construction, a uniform pressure or tension is obtained, over the entire surface of the movable plate S, and a uniform pressure is thereby exerted upon all portions of the sheets or envelopes.

As shown more particularly in Fig. 3 of the drawings, the entire back of the machine is closed by a cover M conveniently pivoted at its lower end to the casing or frame as at $m$ and secured at its upper end by means of a suitable lock $m'$. By this construction when it is desired to refill the receptacles or compartments, with sheets or envelopes, the cover M may be unlocked and swung open so as to expose the rear ends of said receptacles or compartments and after the same have been filled may be again closed and locked in an obvious manner.

While we have shown and described our device as adapted more particularly for a stationary holder and distributer, yet we would have it understood that we do not desire to limit ourselves to the precise form or forms of construction shown and described as various details may be modified at will without departure from our original invention, and by slight modifications of construction our present improvement may be readily adapted to various purposes other than that described herein.

Having thus described our invention, what we claim as new, and desire to secure by Letters Patent of the United States, is—

1. The combination in a stationery holding and distributing device of a spring pressed plate for supporting a series of articles to be distributed, a slot or opening in the front wall of the casing, a shoulder extending from one inner edge of said slot an oblique face upon the other inner edge of said slot, ribs or flanges in alignment with the edge of said projecting shoulder and arranged in opposition to said spring pressed plate, and a suitable friction device adapted for engagement with the first article of the series, to advance the same through said slot or opening, substantially as described.

2. In a device for holding and distributing sheets of paper, envelopes or the like, the combination with a movable support for a series of said articles, flanges arranged in opposition to said support, a friction device for engagement with the one of said articles next to said flanges, a discharge slot in the front wall of the device, having an oblique inner face, and anti-friction rollers journaled in said flanges, and arranged to engage with said article, substantially as described.

3. In a device for holding and distributing sheets of paper or similar articles, the combination with a movable support for a series of such articles, a discharge slot or opening in the front wall of the device and provided with an oblique edge, of a friction device adapted for engagement with the first article of the series to advance the same through said slot and an auxiliary friction device comprising a pivoted arm or loop adapted for engagement with said first article of the series prior to the engagement of the main friction device therewith, substantially as and for the purpose described.

4. In a device for holding and distributing sheets of paper or similar articles, the combination with a movable support for a series of such articles, a discharge slot or opening in the front wall of the device and provided with an oblique edge, of a friction device adapted for engagement with the first article of the series to advance the same through said slot, an auxiliary friction device comprising a pivoted arm or loop adapted for engagement with said first article of the series prior to the engagement of the main friction device therewith, and suitable means for holding the main friction device out of engagement with said article during the engagement of the auxiliary friction device therewith, substantially as and for the purpose described.

5. A friction device for advancing sheets of paper, envelopes or the like, comprising a pivoted arm supported upon a movable carrier, a cylindric block detachably engaged with the free end of said arm, and a tubular or cup-shaped shoe of yielding material secured to the outside of said cylindric block and adapted for engagement at its open end with the surface of the article to be advanced, substantially as described.

In testimony whereof we sign this specification in the presence of two witnesses.

HUGO LOEWENBACH.
CHARLES FISHER.

Witnesses:
JOHN E. WILES,
H. R. BAUMGARTH.